June 16, 1925.   1,542,515
E. B. MEAD
BRAKE CONTROL
Filed July 14, 1924
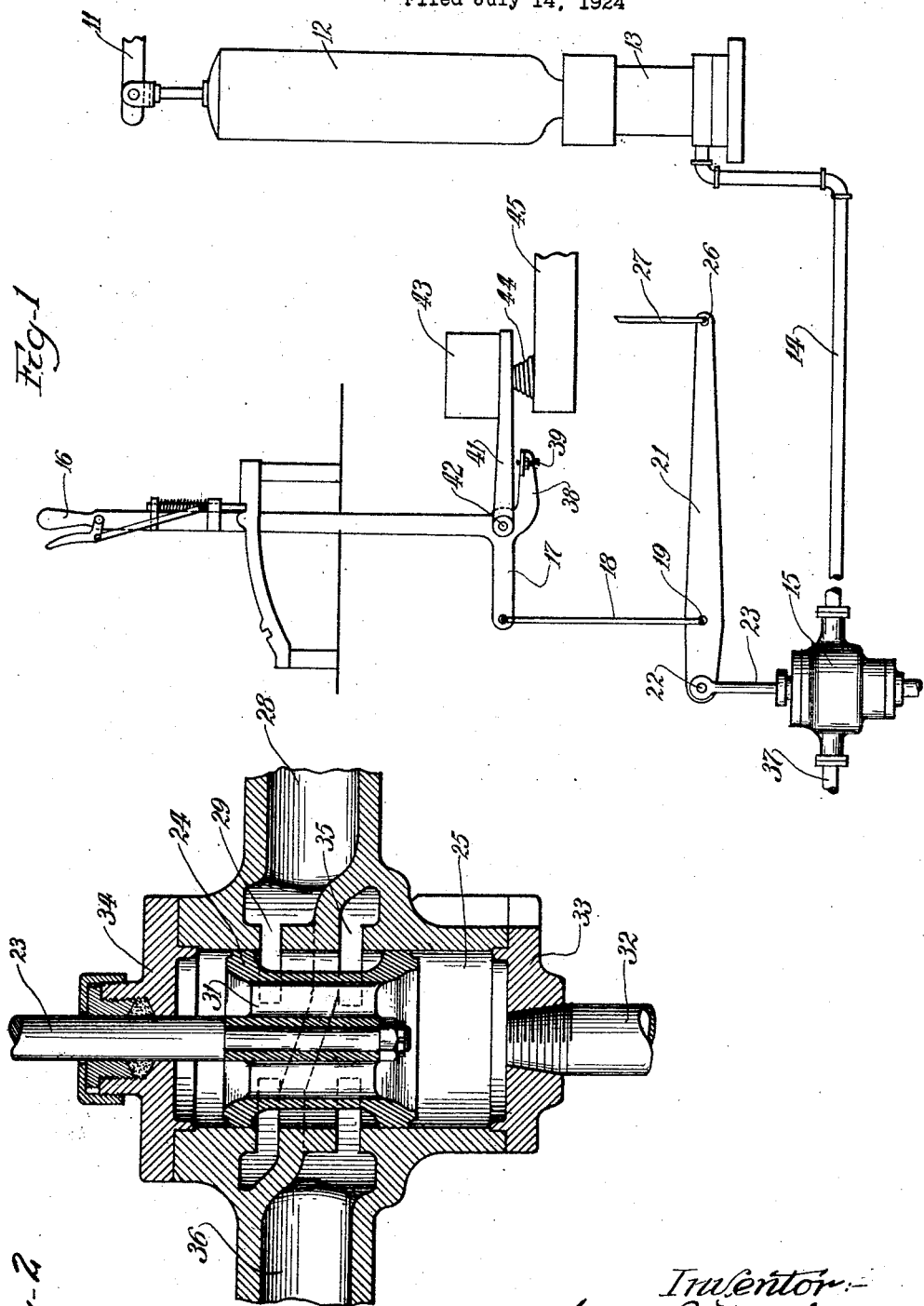

Patented June 16, 1925.

1,542,515

UNITED STATES PATENT OFFICE.

EZRA B. MEAD, OF OTTUMWA, IOWA, ASSIGNOR TO OTTUMWA IRON WORKS, OF OTTUMWA, IOWA, A CORPORATION OF IOWA.

BRAKE CONTROL.

Application filed July 14, 1924. Serial No. 725,812.

*To all whom it may concern:*

Be it known that I, EZRA B. MEAD, a citizen of the United States, residing in Ottumwa, in the county of Wapello and State of Iowa, have invented a new and useful Improvement in Brake Controls, of which the following is a specification.

The present invention relates to braking apparatus for mine hoists and the like, and has more particular reference to a proportional pressure brake control of the general type shown in my prior Patent No. 1,373,195. In the apparatus of said patent, a control is provided which enables the hoist engineer, controlling a cage not visible from the control station, to be constantly advised as to braking conditions, for the reason that the position of the operating lever and the force required to hold said lever in position are proportional to the extent of braking action. Such a control is highly desirable when the brakes are applied by power, since otherwise he would be without means of accurately knowing the extent of application of the brakes, as would be the case if braking were done by hand so that the force exerted by the operator in pulling on the hand lever would bear a direct pressure relation to braking conditions. When the proportional pressure control of my prior patent is employed, a recognizable relation is maintained between the force exerted upon the hand lever by the operator and the extent of braking action, and this even though the brakes are applied by power instead of by hand, and the labor required is thus greatly minimized.

A primary object of the present invention is to provide a proportional pressure control accomplishing the above result in a different and, from certain aspects, perhaps preferable manner.

In accordance with the invention, a device is employed for causing the operator to feel pressure upon his lever at the time the brakes touch the brake drum and thereafter in accordance with the extent of braking action, said device, however, having no effect upon and being, in reality, independent of the mechanism provided for controlling the power by which the brakes are applied.

An important advantage of this type of apparatus is its relative simplicity, both as to construction and theory of operation.

Numerous other objects and advantages of the invention will be apparent as it is better understood from the following description, which, taken in connection with the accompanying drawings, discloses a preferred embodiment thereof.

Referring to the drawings,

Figure 1 is a diagrammatic view of a brake control in which my invention is embodied; and Fig. 2 is an enlarged sectional view of the pressure control valve shown at the lower left-hand corner of Fig. 1.

In the illustrative embodiment of the invention shown upon the drawings, the brake (not shown) is connected to a lever 11, from which a weight 12 is suspended above a piston cylinder 13, which is supplied with fluid pressure by means of a conduit 14, leading from a valve 15, which is controlled by instrumentalities, to be hereinafter described, through operation of a hand lever 16 positioned at the operator's station. Said weight 12 is normally held in raised position by the pressure in the piston cylinder 13, and when in this position, the brake is held out of contact with the brake drum. When the pressure is lessened in the cylinder 13, said weight 12 descends, providing the power by which the brake is applied. Normally the brake blocks are held a considerable distance away from the drum, in order to insure that no rubbing will occur during motion of the hoist when braking is not desired and, consequently, a considerable motion of the weight 12 occurs before said blocks touch the drum. Thereafter, the weight continues to move while taking up the compression of the wood and the spring of the levers until the weight is hanging completely on the drum. During this motion, the weight follows the piston in the cylinder 13 and after the weight is hanging on the drum and cannot lower any further, said piston preferably has some additional motion before reaching the bottom of its stroke.

The lever 16 is formed in one with a lever arm 17, which is connected by a rod 18 with a fulcrum point 19 on a horizontal floating lever 21. Said lever 21 connects at 22 with a stem 23 of a piston 24, which is vertically movable in the bore 25 of the valve 15. The opposite end 26 of the lever 21 connects with a rod 27, which is movable with the weight 12 through a suitable form of connection (not shown).

When the lever 16 is moved to the left, viewing Fig. 1, the point 22 on the lever 21 is moved downwardly by reason of the fact that the point 26 at the opposite end of said lever is at first held stationary, and this depresses the piston 24 in the cylinder 25, opening the valve to exhaust, as will now be described.

The thrust cylinder 13, as previously stated, is connected with the valve 15 by means of a conduit 14, which communicates with a passage 28 at one side of said valve. An exhaust port 29 is provided at the top of the valve so that when the piston 24 is lowered, the oil from the cylinder 13 may pass into the upper part of the chamber 25, down through passages 31 in the piston 24 and out through a pipe 32, screwed into the bottom closure 33 of the valve and leading to a sump tank. The top of said valve is closed by means of a stuffing box 34. A port 35, in the lower part of the valve, communicates with the passage 28 and is supplied from an accumulator through a passage 36 communicably connected with a pipe 37 extending from the side of said valve opposite the conduit 14. It will be seen, therefore, that when the piston 24 is in normal raised position, as shown in Fig. 2, communication is established between a source of supply and that thrust cylinder 13, holding the weight 12 in raised position.

After the valve has been opened to exhaust, the piston in the thrust cylinder 13 descends, followed by the weight 12, and this lowers the rod 27 which acts upon the floating lever 21 around the point 19 as a fulcrum and brings the point 22 and valve stem 23 back up to mid-position. Continued movement of the lever 16 causes this cycle of operation to recur and this may be repeated until the brake weight hangs on the drum and cannot be lowered any further. It will be apparent that movement of the lever 16 in the opposite direction will tend to raise the point 22 of the lever 21 and therewith the valve stem 23, so that the extent of braking action may be accurately controlled and is in accordance with the position of the hand lever.

In my prior patent hereinbefore referred to, provision is made for further assuring that the operator will be constantly advised as to braking conditions by reason of the pressure upon his lever, which is proportional to the extent of the braking action. This is accomplished in the apparatus of said patent by means of a weight, which also forms a part of the control of the valve by which the pressure in the thrust cylinder is regulated. In accordance with the present invention, the valve is controlled in the manner hereinbefore described and proportional pressure upon the hand lever is created in manner diagrammatically illustrated in Fig. 1. The lever 16 has an arm 38 extending horizontally at the lower end thereof and in said arm there is provided an adjusting screw 39 adapted, after predetermined upward motion of the arm, to contact with a lever 41 which is loose on the pivot point 42 of said lever 16 and carries at its outer end a weight 43, which is supported upon a coil spring 44, resting upon a rigid support 45. The tension of the spring 44 and the size of the weight 43 are so adjusted with respect to the spring of the levers and brake blocks of the brake mechanism that the pressure felt upon the hand lever, as the weight is lifted from the spring 44, is proportional to the extent of the braking action and in this manner the operator is kept advised of braking conditions and is enabled to control the hoist accordingly. Normally, the weight 43 rests entirely upon the spring 44 and the set screw 39 is out of contact with the lever 41. When the lever 16 has been moved sufficiently to lower the weight 12 to the point at which contact is established between the brake blocks and the brake drum, the screw 39 comes in contact with the lever 41 and the operator begins to feel the weight 43. At first, the lifting of said weight is assisted by the tension of the spring 44, but as it is freed therefrom, it is more and more felt by the operator, so that he has the same sensations as though he were applying the brake directly.

It is thought that the invention and many of its attendant advantages will be understood from the foregoing description, and it will be apparent that various changes may be made in the form, construction and arrangement of the parts without departing from the spirit and scope of the invention, or sacrificing all of its material advantages, the form hereinbefore described being merely a preferred embodiment thereof.

I claim:—

1. A brake control, comprising in combination a brake applying power source, a brake releasing power source, a manipulative device, a connection between said manipulative device and said brake releasing power source, said connection being actuated by said device, and means independent of said connection and brake releasing power source for maintaining a recognizable relation between the force exerted upon said device by an operator and the extent of braking action.

2. A brake control, comprising in combination a brake applying power source, a brake releasing power source, a manipulative device, a connection between said manipulative device and said brake releasing power source, said connection being actuated by said device, and means independent of said connection and brake releasing power source for maintaining a recognizable relation between the force exerted upon said device by an operator and the extent of braking action, said means comprising a spring-supported weight associated with said manipulative device.

3. A brake control, comprising in combination a brake applying power source, a brake releasing power source, a manipulative device, a connection between said manipulative device and said brake releasing power source, said connection being actuated by said device, and means independent of said connection and brake releasing power source for maintaining a recognizable relation between the force exerted upon said device by an operator and the extent of braking action, said means comprising a weight rigidly connected with said manipulative device, a spring supporting said weight and a rigid support for said spring.

4. A brake control, comprising in combination a brake applying power source, a brake releasing power source, a manipulative device, a connection between said manipulative device and said brake releasing power source, said connection being actuated by said device, and means having no direct relation to the brake application but causing the operator to feel pressure upon said manipulative device proportional to the extent of the braking action.

5. A brake control, comprising a weight for applying the brakes, fluid pressure means for lifting said weight to release the brakes, means including a hand lever for controlling the pressure in said last-mentioned means, and means associated with said lever and having no direct relation to said pressure controlling means, whereby the force required to operate the lever is proportional to the braking action.

6. A brake control, comprising a weight for applying the brakes, fluid pressure means for lifting said weight to release the brakes, means including a hand lever for controlling the pressure in said last-mentioned means, and means associated with said lever and having no direct relation to said pressure controlling means, whereby the force required to operate the lever is proportional to the braking action, said means comprising a weight connected with said lever and a resilient support for the weight.

7. A brake control, comprising a weight for applying the brakes, a pressure cylinder for controlling the position of said weights, a valve for controlling the pressure in said cylinder, a manipulative device for operating said valve, and means having no effect upon the valve but creating resistance to the operation of said manipulative device proportional to the extent of braking action.

EZRA B. MEAD.